(12) United States Patent
Forscht et al.

(10) Patent No.: US 9,793,792 B2
(45) Date of Patent: Oct. 17, 2017

(54) CONTROL OF A HALF-BRIDGE

(71) Applicant: Robert Bosch GmbH, Stuttgart (DE)

(72) Inventors: Michael Forscht, Appenweier (DE); Georg Schulze-Icking-Konert, Buehlertal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/785,685

(22) PCT Filed: Apr. 17, 2014

(86) PCT No.: PCT/EP2014/057847
§ 371 (c)(1),
(2) Date: Oct. 20, 2015

(87) PCT Pub. No.: WO2014/180644
PCT Pub. Date: Nov. 13, 2014

(65) Prior Publication Data
US 2016/0087521 A1     Mar. 24, 2016

(30) Foreign Application Priority Data

May 8, 2013   (DE) ......................... 10 2013 208 574

(51) Int. Cl.
*H02M 1/38* (2007.01)
*H02M 7/5387* (2007.01)

(52) U.S. Cl.
CPC ......... *H02M 1/38* (2013.01); *H02M 7/53873* (2013.01)

(58) Field of Classification Search
CPC .. H02M 1/38; H02M 7/53873; H02M 7/5387; H02M 3/158; H02M 3/1588; H03K 17/165; H03K 17/6871; H03K 2217/0036
USPC ................................ 323/222, 282, 284, 285
See application file for complete search history.

(56) References Cited

U.S. PATENT DOCUMENTS

| 6,396,250 | B1 * | 5/2002 | Bridge | H02M 3/1588 323/283 |
| 7,800,350 | B2 * | 9/2010 | Pigott | H02M 1/38 323/271 |
| 7,868,597 | B2 * | 1/2011 | Dequina | H02M 1/38 323/222 |
| 7,906,948 | B2 * | 3/2011 | Qiu | H02M 3/1588 323/222 |
| 8,008,902 | B2 * | 8/2011 | Melanson | H02M 3/1563 323/285 |
| 8,648,583 | B2 * | 2/2014 | Brown | H02M 1/38 323/282 |

(Continued)

*Primary Examiner* — Kyle J Moody
(74) *Attorney, Agent, or Firm* — Norton Rose Fulbright US LLP; Gerard Messina

(57) ABSTRACT

A half-bridge includes a first switching device for connecting a terminal to a first potential, and a second switching device for connecting the terminal to a second potential. A method according to the present invention for controlling the half-bridge includes the steps of outputting a closing signal for the first switching device while the second switching device is open, and of ascertaining a latency period between the start of the closing signal and a collapse of a voltage applied across the first switching device. Subsequently, a dead time that lies between an opening of the second switching device and a closing of the first switching device is minimized on the basis of the ascertained latency period.

9 Claims, 3 Drawing Sheets

(56) References Cited

U.S. PATENT DOCUMENTS

| | | | | |
|---|---|---|---|---|
| 8,933,679 | B2* | 1/2015 | Zhak | G05F 3/08 |
| | | | | 323/222 |
| 9,128,498 | B2* | 9/2015 | Shook | G05F 1/10 |
| 9,166,469 | B2* | 10/2015 | Familiant | H02M 1/38 |
| 2005/0110475 | A1* | 5/2005 | Chapuis | H02M 1/38 |
| | | | | 323/282 |
| 2006/0152204 | A1* | 7/2006 | Maksimovic | H02M 1/38 |
| | | | | 323/284 |
| 2009/0096502 | A1* | 4/2009 | Miyamoto | H02M 1/38 |
| | | | | 327/401 |
| 2011/0298527 | A1* | 12/2011 | Lloyd | H03K 17/18 |
| | | | | 327/478 |
| 2014/0320178 | A1* | 10/2014 | Hosini | H03K 17/08128 |
| | | | | 327/109 |
| 2016/0065065 | A1* | 3/2016 | Noebauer | H02M 3/1588 |
| | | | | 323/271 |
| 2016/0126822 | A1* | 5/2016 | Lyle | H02M 1/088 |
| | | | | 363/123 |
| 2016/0126946 | A1* | 5/2016 | Joos | H03K 17/165 |
| | | | | 327/109 |

* cited by examiner

CONTROL OF A HALF-BRIDGE

FIELD OF THE INVENTION

The present invention relates to a control of a half-bridge for actuating an electrical consumer. In particular, the present invention relates to an optimization of a time sequence of switching states on the half-bridge.

BACKGROUND INFORMATION

A bridge circuit having a half-bridge can be used for controlling an electrical consumer such as an electric motor or an electric heater, for instance. The half-bridge encompasses a first switching device for connecting a terminal to a first potential, and a second switching device for connecting the terminal to a second potential. The consumer is operated between the terminal and an appropriate potential. This potential may be fixedly selected or be controlled with the aid of a further half-bridge. The two half-bridges may provide the consumer with mutually complementary potentials, so that a current direction is controllable by the consumer through the actuation of the half-bridges.

The switching devices of the half-bridge must be switched in such a way that both switching devices are not closed at the same time. Otherwise a high short-circuit current would flow through the circuit elements, which could damage or destroy the circuit elements. It should be noted here that if a switching device is implemented as a field-effect transistor, this switching device may let current pass in one direction even when deactivated. To avoid the short-circuit current through the switching devices, a predefined dead time during which none of the switching devices is closed is therefore usually interposed between the opening of one of the switching devices and the closing of another switching device. As a rule, this dead time is determined on the basis of worst-case scenario calculations plus a safety margin.

The longer the dead time, the greater a power loss may be at the half-bridge. If the switching device is open, then the power loss is the product from the flowing current and the voltage dropping across the switching device. In case of a field-effect transistor, the current may lie in a range of 10 A and the dropping diode voltage at approximately one volt. During a dead time of approximately one microsecond, the power loss thus amounts to approximately 10 µJ. In the closed state, the power loss of the switching device is the product from the square of the flowing current and the forward resistance, the latter possibly being in the range of approximately 6 mΩ in a field-effect transistor. In a pulse width modulation having a period duration of 50 µs, the power loss outside the dead time thus amounts to approximately 30 µJ. Although the dead time represents only 2% of the period duration, it consequently has a share of approximately 30% in the power loss.

SUMMARY OF THE INVENTION

Therefore, it is an object of the present invention to provide a method, a computer program product, and a control device for controlling a half-bridge, so that the power loss is reduced. The present invention achieves this objective by a method, a computer program product and a control device having the features of the independent claims. The dependent claims reflect specific embodiments.

A half-bridge includes a first switching device for connecting a terminal to a first potential, and a second switching device for connecting the terminal to a second potential. A method according to the present invention for controlling the half-bridge includes the steps of outputting a closing signal for the first switching device while the second switching device is open, and of ascertaining a latency period between the start of the closing signal and a collapse of the voltage applied across the first switching device. Subsequently, a dead time which lies between an opening of the second switching device and a closing of that first switching device is minimized on the basis of the ascertained latency period.

This makes it possible to dynamically adapt the dead time within or outside of an ongoing operation of the half-bridge. In other words, a consumer controlled by the half-bridge may be energized or non-energized while the dead time is minimized. In particular when the latency is dependent upon external influences, such as an ambient temperature, the described method can ensure that the switching devices are actuated in an optimized manner, so that the dead time is minimized and a power loss is reduced. An electromagnetic compatibility (EMC) is also able to be improved. If the switching device includes a MOSFET, a radiation of electromagnetic interference may be caused to a considerably extent by a body diode and parasitic inductances of the MOSFET. The shorter the period during which this oscillating circuit is active, the lower the electromagnetic emissions may be. If the switching devices of the half-bridge are controlled with sufficient precision, it may also be possible to omit damping elements (so-called snubbers) at the MOSFET.

In one specific embodiment, the method is also used for a reverse switching operation. To do so, a further latency period between the end of the closing signal and a rise in the voltage applied across the first switching device is ascertained. On the basis of the ascertained further latency period, another dead time, which lies between a closing of the second switching device and an opening of the first switching device, is minimized.

When minimizing the dead time, the closing signal for the first switching device may be output at least one predefined latency period earlier than an opening signal for the second switching device. If the closing signal is output exactly one latency before the opening signal for the second switching device, then the dead time is able to be reduced down to 0. Since the latency period of the first switching device is known, a reduction of the dead time into a negative range, so that both switching devices are closed simultaneously, is able to be prevented in a reliable manner.

In one variant, the switching devices are closed in alternation in order to control a consumer connected to the terminal with the aid of a pulse width modulation. The consumer may be provided on board of a motor vehicle, in particular. For example, the consumer may include an electric motor or some other electrical load. The control of a consumer on board of a motor vehicle with the aid of pulse width modulation is common, so that the method may contribute to minimizing a power loss on board of the motor vehicle. This helps in reducing a fuel consumption or the pollutant emissions of the motor vehicle.

In one further specific embodiment, the method furthermore includes steps of outputting a closing signal for the second switching device while the first switching device is open, of ascertaining a latency period between the start of the closing signal and a collapse of a voltage applied across the second switching device, and of minimizing a dead time that lies between an opening of the first switching device and a closing of the second switching device, on the basis of the ascertained latency period.

Because of such a symmetrical configuration of the method, the latencies of both switching devices of the half-bridge are able to be detected and the corresponding dead times in the switchover of the switching devices be minimized.

In one further development, an additional half-bridge having a further terminal is provided for operating a consumer between terminals of the half-bridge, and switching elements of different half-bridges are provided with closing signals in such a way that they close simultaneously, if possible. In this way the method can also be used for actuating an H-bridge made up of two half-bridges. Even bridge circuits having more than two half-bridges can be actuated in a corresponding manner.

The method is especially suitable for the control of a commutated or brushless electric motor, for which two, three or four half-bridges may be provided. The electric motor in particular may represent a drive of a windshield wiper, a window raiser or some other device on board of a motor vehicle.

An especially precise adjustment of the dead time is able to be achieved by the synchronization of the activation instants of switching devices that correspond to one another. The use of the half-bridge also makes it possible to actuate a consumer for which a direction of the current flow is of importance, such as an electric motor, for instance.

In one specific embodiment, the latency period is ascertained periodically. This makes it possible to adapt the latency period to a varying latency period of the switching device. For example, the first switching device may include a field-effect transistor which has a temperature-dependent latency period. During an operation of the field-effect transistor in an environment that is heating up or cooling down, this effect can be compensated by the periodic ascertainment of the latency period.

A computer program product according to the invention includes a program code arrangement having program code for carrying out the described method when the computer program product is running on a processing device or stored on a computer-readable data carrier.

A control device according to the present invention for controlling a half-bridge having a first switching device for connecting a terminal to a first potential, and a second switching device for connecting the terminal to a second potential includes a first actuating device for outputting a closing signal to the first switching device, a second actuating device for outputting an opening signal to the second switching device, a comparator for ascertaining that a voltage applied across the first switching device is breaking down, and a time meter for ascertaining a latency period between the start of the closing signal while the second switching device is open, and a breakdown of the voltage. The first actuator is set up to minimize a dead time that lies between an opening of the second switching device and a closing of the first switching device, based on the ascertained latency period.

The switching devices may include field-effect transistors, in particular. The field-effect transistors can be integrated into the control device. This makes it possible to provide a compact and powerful control device by which a consumer is able to be controlled at a reduced power loss.

The switching devices may be set up for use in an environment in which the temperatures vary quite considerably. Such an environment, for example, may include an actuator, a module, or a control element on board of a motor vehicle.

The present invention will now be described in greater detail with reference to the accompanying figures.

DETAILED DESCRIPTION

Figure 1:
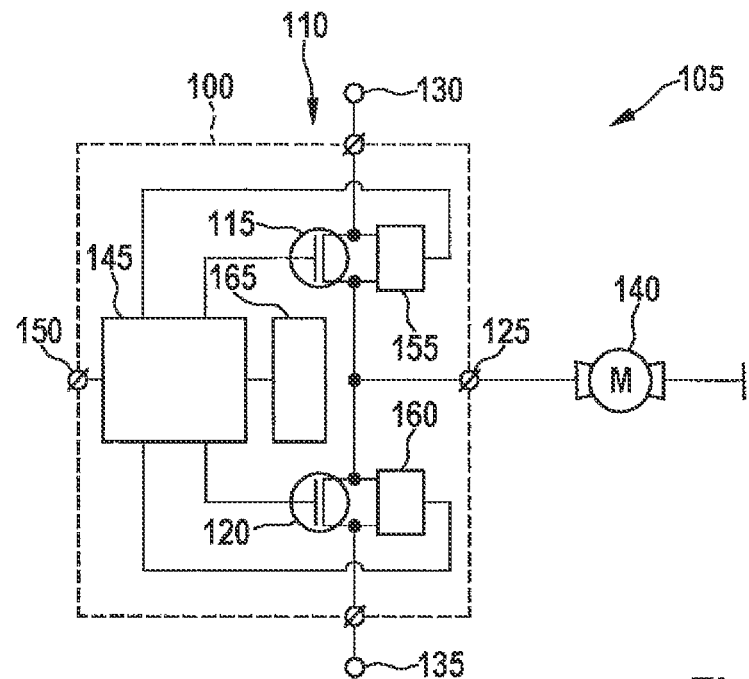
FIG. 1 shows a circuit diagram of a device for controlling a half bridge.

FIG. 1 shows a control device 100 for use on board of a motor vehicle 105. Control device 100 is set up for controlling half-bridge 110, which may be integrated in control device 100. Half-bridge 110 includes a first switching device 115 and a second switching device 120, which, for example, may be configured as bipolar transistors, IGBT's (bipolar transistors having an insulated gate electrode) for HEV or EV or as field effect transistors, and moreover, which may be as MOSFETs. First switching device 115 is configured to connect a terminal 125 to a first potential 130, and second switching device 120 is configured to connect terminal 125 to a second potential 135.

A consumer 140 may be connected to half-bridge 110 or control unit 100 between terminal 125 and a ground terminal. Consumer 140, for example, may include an electric motor, especially on board of a motor vehicle, such as for operating a windshield wiper. The ground potential may lie between first potential 130 and second potential 135.

A processing unit 145 is provided for actuating switching devices 115 and 120, which in particular may be configured as a programmable microcomputer. Control unit 100 may include an interface 150, which is connected to processing unit 145 in order to enable a communication between an external control component and control unit 100. A first comparator 155 is allocated to first switching device 115 and provides a signal to processing unit 145 when a voltage applied across first switching device 115 collapses. First comparator 155 may be provided for what is commonly known as drain source monitoring in order to detect a short-circuited first switching device 115 during operation. First comparator 155 may be included in or integrated into the control device.

A second comparator 160 is allocated to second switching device 120 and otherwise configured in the same way as first comparator 155. In addition, a timing unit 165 is provided, which is connected to processing unit 145. Timing unit 165 may be set up as a programmable counter or timer, for instance. Timing unit 165 is able to be started or stopped by processing unit 145 and a counter reading may be set or read out. In one further specific embodiment, timing unit 165 can be started or stopped by one of the signals from comparators 155 or 160.

Processing unit 145 is set up to determine a latency period with the aid of timing unit 165 and first comparator 155, which elapses between the output of a closing signal to first switching device 115 and an actual closing of switching device 115. The actual closing can be detected by the collapse of the voltage applied across first switching device 115. If the voltage collapses, first comparator 155 can output a corresponding signal to processing unit 145 or timing unit 165. In the illustrated specific embodiment including second comparator 160, a corresponding determination may be carried out also for a latency period of second switching device 120.

In the present example, processing unit 145 is configured to output opening signals to first switching device 115 and possibly to second switching device 120 as a function of the previously ascertained latency periods, so that the actual closing times of switching devices 115 and 120 are able to be better adapted to the opening times of the respective other switching devices 115, 120 or some other, external switching device. Processing unit 145 in particular is configured to provide closing signals to switching devices 115 and 120 in alternation in order to realize a pulse width modulation of consumer 140.

Figure 2:
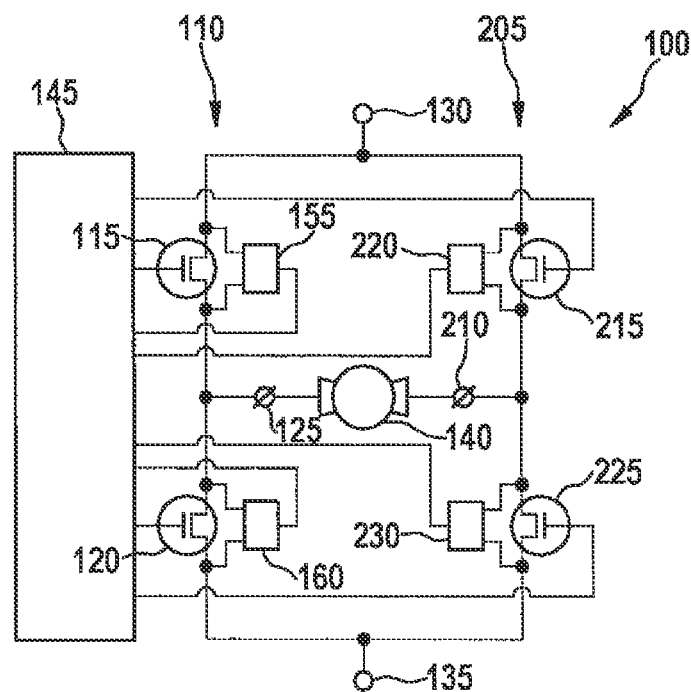
FIG. 2 shows a circuit diagram of an H-bridge with the device from FIG. 1.

FIG. 2 shows a circuit diagram of device 100 from FIG. 1 in another specific development, not all of the elements from FIG. 1 also being shown in FIG. 2. In the illustrated specific embodiment, a further half-bridge 205 is provided in addition to half-bridge 110, which has a corresponding design and whose further terminal 210, brought to the outside, is connected to the other terminal of consumer 140. Further half-bridge 205 includes a third switching device 215, to which a third comparator 220 is assigned, and a fourth switching device 225, to which a fourth comparator 230 is assigned. Further half-bridge 205 including comparators 220 and 230 may be included in control device 100 or integrated therein. More specifically, consumer 140 may be a commutated or brushless electric motor.

In the specific embodiment illustrated, processing unit 145 may be configured to ascertain the latency periods of third switching device 215 and fourth switching device 225 as well. In addition, processing unit 145 is set up to supply switching devices 115, 120, 215 and 225 with opening signals or closing signals as a function of the ascertained latency periods. As a rule, switching devices shown at a diagonal offset in FIG. 2 are closed or opened together, so that either switching devices 155 and 225 or switching devices 220 and 160 are closed at the same time. The actuation of switching devices 155, 160, 220 and 230 in order to open and close them may be realized within the framework of a pulse width modulation. The ascertained latency periods may be compensated so that dead times between the activation of a pair of switching devices 115 and 225 or 120 and 215 and the deactivation of the respective other pair of switching devices 120 and 215 or 115 and 225 are minimized, if possible.

Figure 3:
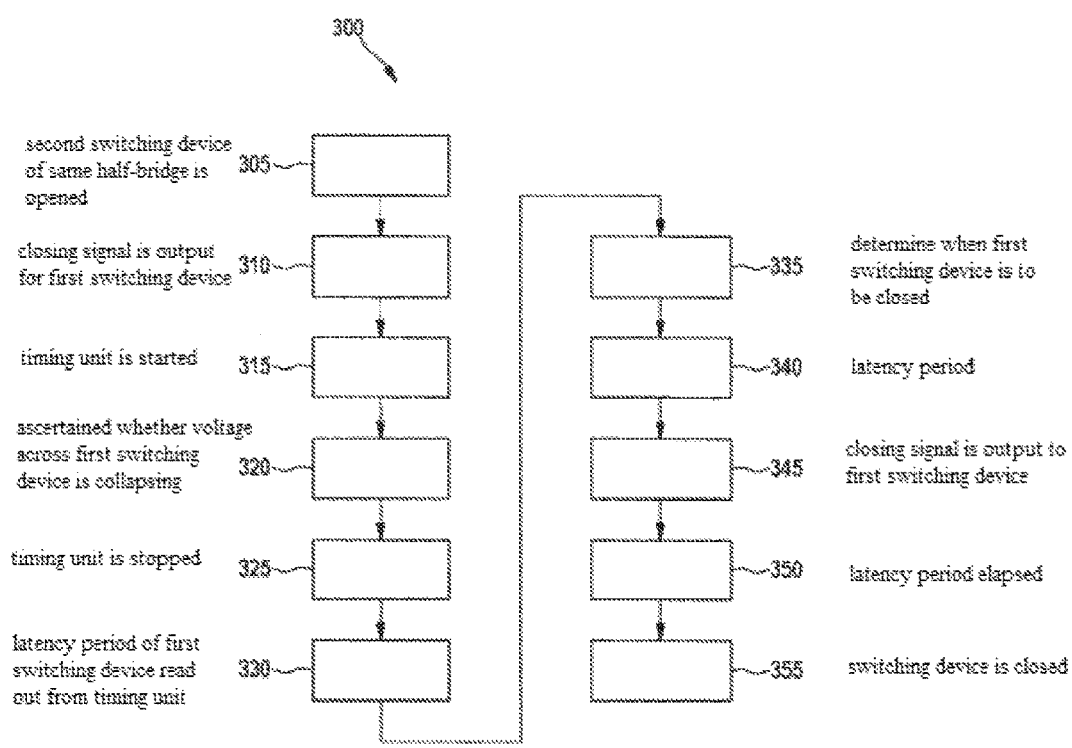
FIG. 3 shows a flow chart of a method for ascertaining a latency period of a switching device in one of the bridges from FIG. 1 or 2.

FIG. 3 shows a flow chart of a method for controlling one of half-bridges 110 or 205 of FIG. 1 or 2. In particular, method 300 is set up to be carried out on processing device 145.

In a first part of method 300, a latency period of first switching device 115 is ascertained, this part of method 300 also being able to be used in a corresponding manner for any other actuated switching device 120, 215 and 225. In a first step 305, the other switching device of the same half-bridge 110, 205 is opened, which is second switching device 120 in this particular case. This step may also be omitted if the other switching device is already open. In a following step 310, a closing signal is output for first switching device 115. At the same time or as briefly as possible before or afterwards, timing unit 165 is started in a step 315. In a step 320 it is then ascertained whether the voltage across first switching device 115 is collapsing. At the same time or shortly thereafter, timing unit 165 is stopped in a step 325. In a step 330, the latency period of first switching device 115 can then be read out from of timing unit 165. The latency period is the time that first switching device 115 requires in order to enable the flow of an electrical current from first potential 130 to terminal 125 in response to a closing signal.

This concludes the ascertaining of the latency period of first switching device 115. In a following part of method 300, the ascertained latency period may be used for a better control of switching times of first switching device 115. To do so, an instant at which first switching device 115 is meant to be closed is determined in a step 335. Then, in a step 340, a wait takes place until the ascertained instant minus the determined latency period has occurred. In a step 345, a closing signal is then output to first switching device 115. After the latency period has elapsed in step 350, switching device 115 is closed in step 355.

In one specific embodiment, method 300 is used correspondingly also for the reverse switching operation, when first switching device 115 is to be opened and second switching device 110 is to be opened. To do so, switching devices 115 and 120 and the activation or deactivation in the above description have to be switched. As a result, a further latency period between the end of the closing signal and a rise in the voltage applied across the first switching device is ascertained, and then a further dead time, which lies between the closing of the second switching device and the opening of the first switching device, is minimized on the basis of the ascertained further latency period. The different run-throughs of method 300 may also alternate, e.g., within the framework of a periodic control of consumer 140.

Figure 4:
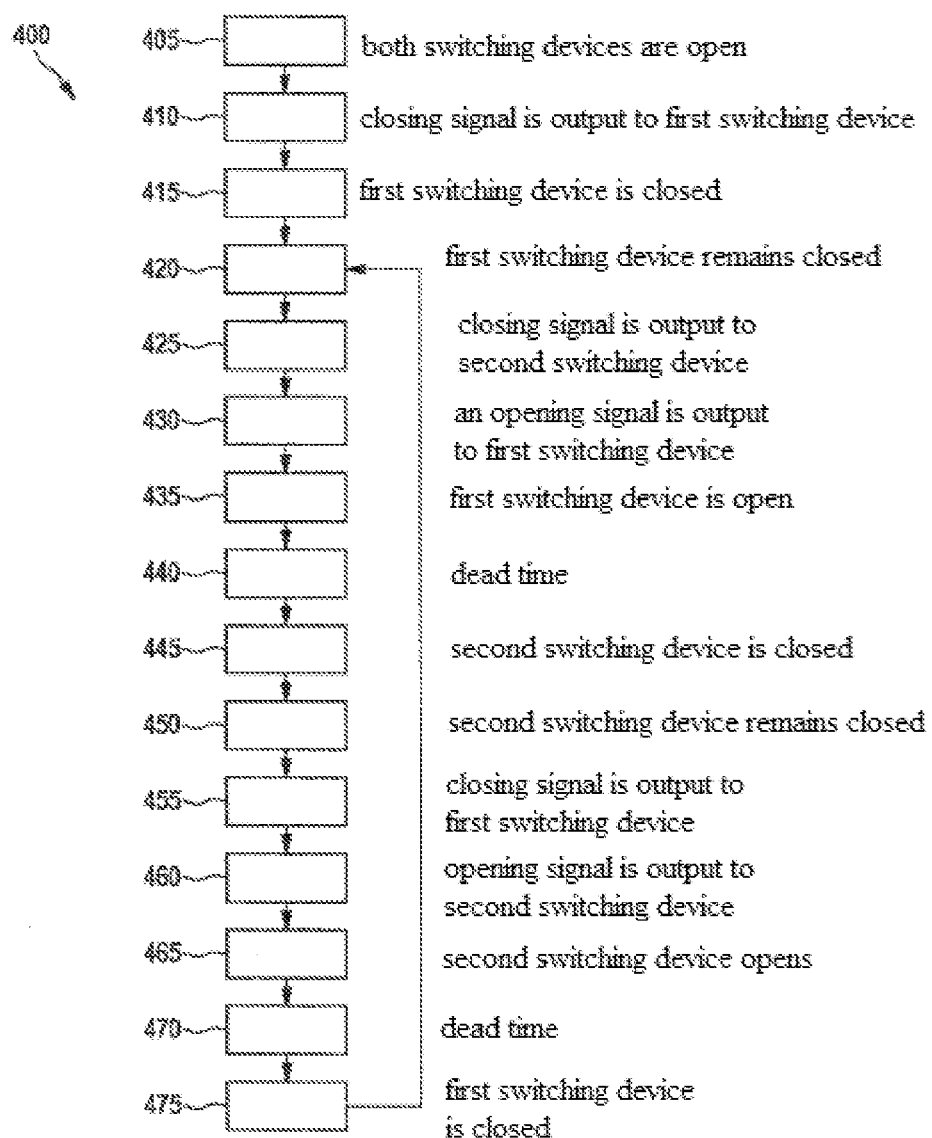
FIG. 4 shows a flow chart of a method for the pulse-width modulated control of a consumer with the aid of one of the devices from FIG. 1 or 2.

FIG. 4 shows a flow chart of a method for the pulse-width modulated control of a consumer 140 using one of control devices 100 from FIG. 1 or 2. Method 400 is likewise configured for running on processing unit 145. In the following text the configuration of FIG. 1 is assumed by way of example; however, it is also possible to support the design from FIG. 2 in a corresponding manner, in which, as described above, switching devices 115, 120, 215 and 225, shown at a diagonal offset in each case, are to be closed or opened at the same time, if possible.

In a first step 405, both switching devices 115 and 120 are open. In a following step 410, a closing signal is output to first switching device 115. After the previously determined latency period has elapsed, first switching device 115 is closed in a step 415. In a step 420, which is also referred to as on-phase in the context of a pulse width modulation, first switching device 115 remains closed. In a following step 425, a closing signal is output to second switching device 120 in order to end the on-phase. In addition, an opening signal is output to first switching device 115 in a step 430. In a step 435, first switching device 115 is open. However, on account of its latency period, second switching device 120 is not yet closed. A dead time therefore arises in a step 440. Subsequently, in a following step 445, the dead time has come to an end, and second switching device 120 is closed.

In a step 450, which is referred to as the off-phase in the field of pulse width modulation, second switching device 120 remains closed. In a step 455, a closing signal is output to first switching device 115, and in a step 460, an opening signal is output to second switching device 120. Second switching device 120 opens quickly and is open in a step 465, while first switching device 115 has not yet closed due to its latency period which has not yet ended. A further dead time ensues in a step 470. In a subsequent step 475, first switching device 115 is closed and the dead time has ended. The circuit is then back in the on-phase of phase 420, and method 400 may be run through again.

What is claimed is:

1. A method for controlling a half-bridge with a first switching device for connecting a terminal to a first potential and a second switching device for connecting the terminal to a second potential, the method comprising:
   outputting a closing signal for the first switching device while the second switching device is open;
   ascertaining a latency period between a start of the closing signal and a collapse of a voltage applied across the first switching device; and
   minimizing a dead time that lies between an opening of the second switching device and a closing of the first switching device based on the ascertained latency period,
   wherein a further latency period between an end of the closing signal and a rise in the voltage applied across the first switching device is ascertained and a further dead time, which lies between a closing of the second switching device and an opening of the first switching device is minimized based on the ascertained further latency period.

2. The method of claim 1, wherein during the minimizing of the dead time, the closing signal for the first switching device is output at least one predefined latency period earlier than an opening signal for the second switching device.

3. The method of claim 1, wherein the first and second switching devices are closed in alternation to control a consumer connected to the terminal with aid of pulse width modulation.

4. The method of claim 1, further comprising:
   outputting a second closing signal for the second switching device while the first switching device is open;
   ascertaining a latency period between a start of the second closing signal and a collapse of a voltage applied across the second switching device; and
   minimizing a dead time that lies between an opening of the first switching device and a closing of the second switching device based on the ascertained latency period.

5. The method of claim 1, wherein the ascertaining of the latency period is carried out periodically.

6. At least one non-transitory computer readable medium having a computer program, which is executable by a processor, comprising:
   a program code arrangement having program code for controlling a half-bridge with a first switching device for connecting a terminal to a first potential and a second switching device for connecting the terminal to a second potential, by performing the following:
   outputting a closing signal for the first switching device while the second switching device is open;
   ascertaining a latency period between a start of the closing signal and a collapse of a voltage applied across the first switching device; and
   minimizing a dead time that lies between an opening of the second switching device and a closing of the first switching device based on the ascertained latency period,
   wherein a further latency period between an end of the closing signal and a rise in the voltage applied across the first switching device is ascertained and a further dead time, which lies between a closing of the second switching device and an opening of the first switching device is minimized based on the ascertained further latency period.

7. A control device for controlling a half-bridge having a first switching device for connecting a terminal to a first potential and a second switching device for connecting the terminal to a second potential, comprising:
   a first actuating device for outputting a closing signal to the first switching device;
   a second actuating device for outputting an opening signal to the second switching device;
   a comparator for ascertaining that a voltage applied across the first switching device is collapsing; and
   a timing unit for ascertaining a latency period between a start of the closing signal and a collapse of the voltage, while the second switching device is open;
   wherein the first actuating device is set up to minimize a dead time that lies between an opening of the second switching device and a closing of the first switching device based on the ascertained latency period,
   wherein a further latency period between an end of the closing signal and a rise in the voltage applied across the first switching device is ascertained and a further dead time, which lies between a closing of the second switching device and an opening of the first switching device is minimized based on the ascertained further latency period.

8. The control device of claim 7, wherein the switching devices include field-effect transistors.

9. The control device of claim 7, wherein the switching devices are set up for use in an environment featuring a highly variable temperature.

* * * * *